UNITED STATES PATENT OFFICE

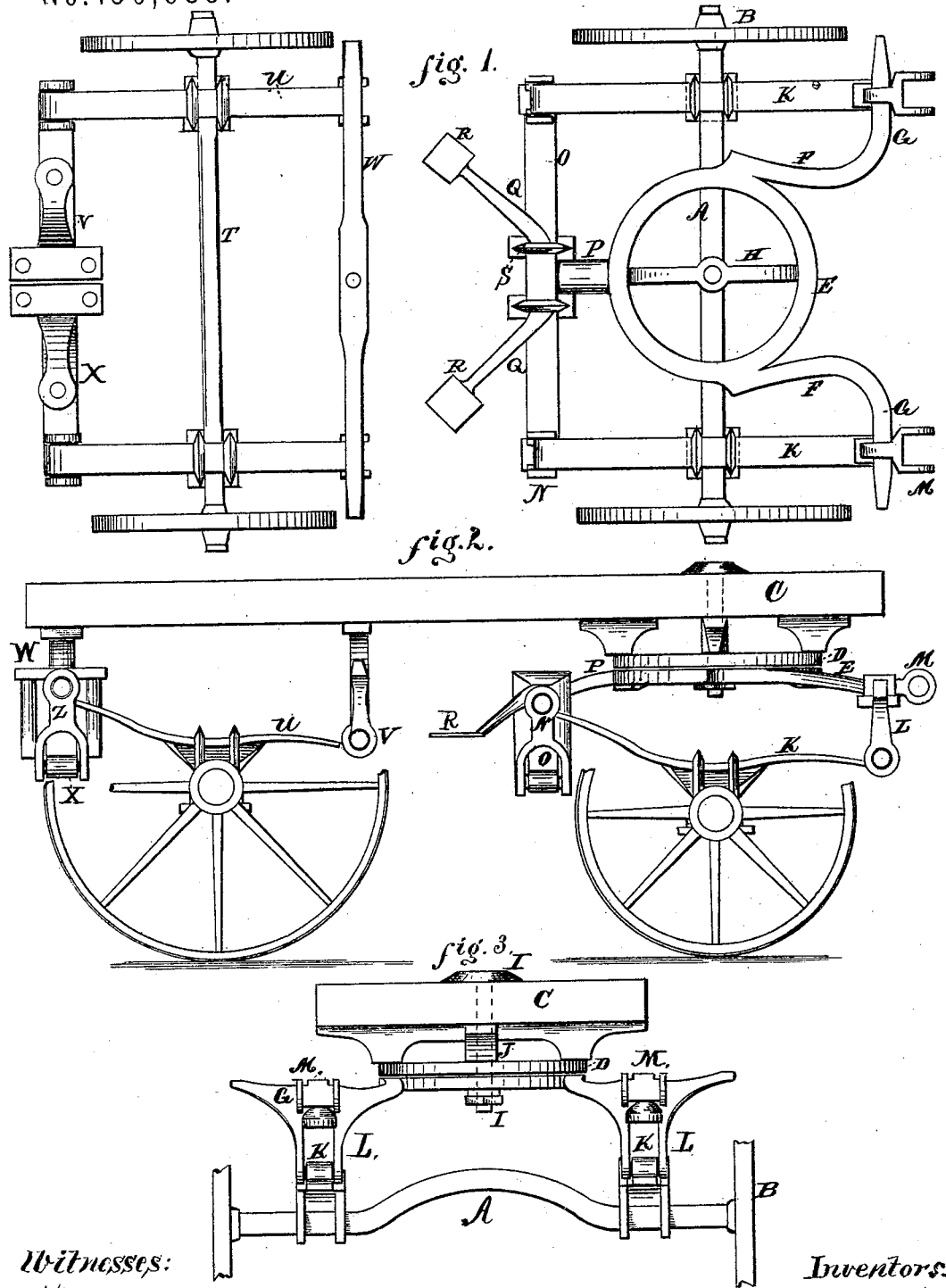

JOHN C. SEELEY AND JAMES BROWNLOW, OF ELMIRA, NEW YORK, ASSIGNORS TO JOHN C. SEELEY, OF SAME PLACE.

IMPROVEMENT IN RUNNING-GEARS FOR CARRIAGES.

Specification forming part of Letters Patent No. 150,089, dated April 21, 1874; application filed April 1, 1874.

*To all whom it may concern:*

Be it known that we, JOHN C. SEELEY and JAMES BROWNLOW, of Elmira, in the county of Chemung and State of New York, have invented certain new and useful Improvements in Wagons, of which the following is a specification:

This invention relates to certain improvements in the running-gear of wagons, designed especially to simplify the construction, and also to combine lightness with durability of parts. The invention consists, principally, in the provision of a movable fifth-wheel or circle-plate, which is arranged in proper relation to a corresponding stationary plate of the wagon or platform, and formed with lateral arms or branches, to the forward ends of which are attached the longitudinal body springs and yokes or draft-eyes, for the attachment of the shafts or thills. The second feature of the invention consists in the employment of steps so arranged that they will be beneath the wagon-body when the latter is moving directly forward, and be caused to project beyond the same by turning the thills in either direction. The invention further consists in forming the movable fifth-wheel portion with a rearwardly-extending arm provided with horizontal branches, on which steps are formed, or the latter may be detachably secured to the same, said extension-arms serving also as a point of attachment for the central portion of the transverse body-spring.

In the accompanying drawing, Figure 1 is a plan or top view of my invention with the wagon body or box removed. Fig. 2 is a side elevation, and Fig. 3 is a front elevation, of the same.

A designates the front axle of the wagon, upon which revolve wheels B, as usual. The body-box or platform C of the wagon has applied to its front portion a stationary circular plate, D, which, in connection with a corresponding plate, E, arranged above the front axle, constitutes the usual fifth-wheel upon which the running-gear turns. Said plate E is provided or formed with lateral arms F, which extend forward longitudinally, and are then branched off transversely, as shown at G in the drawing. A curved bar, H, provided with a central opening, extends across the fifth-wheel plate E, and is designed to receive the lower end of the king-bolt I, which passes through a bearing-socket, J, attached to the under side of the wagon-body. The forward extension-arms F G of the fifth-wheel plate E are intended for the attachment of the longitudinal body-supporting springs K, and for effecting this result the arms G are provided with pendent ears L, between which the front ends of the springs are retained by suitable bolts passing through eyes in the springs. The thills or shafts of the wagon are attached to clips or draft-eyes M, which are secured to the arms G by pendent shanks passing through a detachable bottom plate and then riveted, or the shanks may be provided with screw-threads and nuts. The springs K are attached centrally to the axle A, and their rear ends are secured to or held by bifurcated blocks or eyes N, which are applied to the ends of transverse supporting-spring O. From the rear central portion of the fifth-wheel plate extends an arm, P, which is provided with lateral extensions or branch arms Q, formed with or carrying detachably-applied step-plates R. The transverse spring O is secured to said arms Q at the junction with the arm P, by means of forked bolts or clips S, a wooden or elastic bearing-block being interposed between the spring and arms. The steps arranged as shown are brought into proper position for use by turning the thills or front running-gear in either direction, and will be out of the way when the wagon is moving directly forward. The rear running-gear of the wagon comprises a wheeled axle, T, attached to the two laterally-located longitudinal springs, U, the front ends of which are attached to the pendent ears V of a transverse metallic hanger or curved bar W, which is secured to the under side of the wagon-body, as shown. The rear ends of the springs U are attached to the pendent eyes or hangers Z of a transverse spring, X, which is centrally attached to an open bracket, Y, secured to the wagon-body.

Having thus fully described our invention, what we claim as new, and desire to secure by Letters Patent, is—

1. In a wagon running-gear, the movable fifth-wheel plate E, formed with front extensions F G, for the attachment of the longitudinal springs, as shown and described.

2. The draft-clips M, detachably applied to the arms G of the fifth-wheel plate, all combined substantially as shown and described.

3. The fifth-wheel plate E, formed with rearwardly-extending arms P Q, for the attachment of the transverse body-supporting spring O, as set forth.

4. The steps R R, formed with or detachably applied to the arms Q, as and for the purpose set forth.

In testimony that we claim the foregoing, we have hereunto set our hands this 12th day of August, 1873.

JOHN C. SEELEY.
     JAMES BROWNLOW.

Witnesses:
 R. H. RANSOM,
 U. S. LOWE.